United States Patent [19]

Drinkard, Jr. et al.

[11] 4,109,553

[45] Aug. 29, 1978

[54] SEMIAUTOMATIC TWISTED WIRE CABLE STRIPPER

[75] Inventors: John Halmer Drinkard, Jr., Exton; Charles Eugene Walton, II, Downingtown, both of Pa.

[73] Assignee: Burroughs Corporation, Detroit, Mich.

[21] Appl. No.: 808,071

[22] Filed: Jun. 20, 1977

[51] Int. Cl.² .............................................. H02G 1/12
[52] U.S. Cl. ........................................ 81/9.51; 140/1
[58] Field of Search ................. 81/9.5 A, 9.51; 140/1, 140/149

[56] References Cited

U.S. PATENT DOCUMENTS

| | | | |
|---|---|---|---|
| 2,818,756 | 1/1958 | Moeller | 81/9.51 |
| 3,570,100 | 3/1971 | Kindell et al. | 81/9.51 |
| 3,604,291 | 9/1971 | Weidner | 81/9.51 |
| 3,612,111 | 10/1971 | Meyer | 81/9.51 |
| 3,638,518 | 2/1972 | Parker | 81/9.51 |
| 3,779,290 | 12/1973 | Rich et al. | 140/1 |
| 3,895,426 | 7/1975 | Papsdorf | 81/9.51 X |
| 3,994,188 | 11/1976 | Baba et al. | 81/9.51 |
| 4,043,362 | 8/1977 | Senior et al. | 140/1 |

Primary Examiner—James L. Jones, Jr.
Assistant Examiner—James G. Smith
Attorney, Agent, or Firm—Mark T. Starr; Edmund M. Chung; Kevin R. Peterson

[57] ABSTRACT

An apparatus for simultaneously partially stripping the insulation from the ends of a plurality of wires in a twisted wire cable comprising a first clamp which clamps the midpoint of a length of the twisted wire cable and second and third clamps which clamp the wire ends to position them properly between stripper blades attached to the second and third clamps. The second and third clamps are mounted so they may be slid along a rail. Air activated cylinders pull the second and third clamps in a direction away from the midpoint of the twisted wire cable, partially stripping the insulation. Also disclosed is a modification to the air cylinders which allows the apparatus to simultaneously fully strip and untwist the ends of the wires.

24 Claims, 11 Drawing Figures

SEMIAUTOMATIC TWISTED WIRE CABLE STRIPPER

BACKGROUND OF THE INVENTION

The present invention relates in general to an apparatus for untwisting and simultaneously stripping the insulation from the ends of a plurality of twisted electrical wires. More particularly, the present invention provides the capability of partially stripping the ends instead of fully stripping them, in that insulation is merely pierced and partially removed so that it can be fully removed by hand at a later stage of a manufacturing process.

In the electrical and electronics industry, twisted electrical wires are often used to connect terminals of equipment. The advantages in using twisted wires include more compact wiring and the minimization of inductance effects between the wires. In order to make electrical connections, the ends of the wires making up the twisted wire cable must be untwisted and the insulation stripped therefrom. In a manufacturing environment, it is desirable to manufacture the twisted wire cables prior to the time they are to be installed in electrical equipment. When this is done, corrosion problems often result when the stripped ends of the cables are left exposed to air prior to connection to electrical equipment. Such a problem is prevalent with silver plated wires which are to be attached to connectors by wire wrapping.

Apparatuses for untwisting and stripping insulation from twisted wire pair leads are known in the prior art, for example, in U.S. Pat. No. 3,779,290 by Dennis E. Rich, et al, filed Sept. 28, 1972 and U.S. Pat. No. 3,815,449 by Earl Earnest Folkenroth, filed May 31, 1972. Such apparatuses can only strip the wires on one end of a twisted wire pair at a time. Further, such apparatuses cannot partially strip the insulation from the conductors of a twisted wire pair.

Accordingly, it is a general object of the present invention to provide an apparatus which simultaneously partially strips the insulation from the ends of a plurality of wires in a twisted wire cable.

It is a further object of the present invention to provide an improved twisted wire stripping apparatus.

It is an additional object of the present invention to provide an apparatus for simultaneously untwisting the wires on both ends of a twisted wire cable and stripping the insultation from the ends of the wires.

SUMMARY OF THE INVENTION

The present invention provides an apparatus for semiautomatically partially stripping the insulation from all ends of a plurality of wires in a twisted wire cable.

In accordance with the present invention, the midpoint of a length of the twisted wire cable is held in place by a first clamping assembly. The ends of the twisted wire cable are inserted in second and third clamping assemblies which clamp stripper blades around the wires of the twisted wire cable, piercing the insulation. Actuators move the second and third clamping assemblies along a rail in directions away from the first clamping assembly, causing the insulation to be partially stripped. Also disclosed is a modification to the above described apparatus which fully strips the ends of a twisted wire cable and simultaneously untwists the twisted wire cable.

DESCRIPTION OF THE PREFERRED EMBODIMENT

Figure 1:
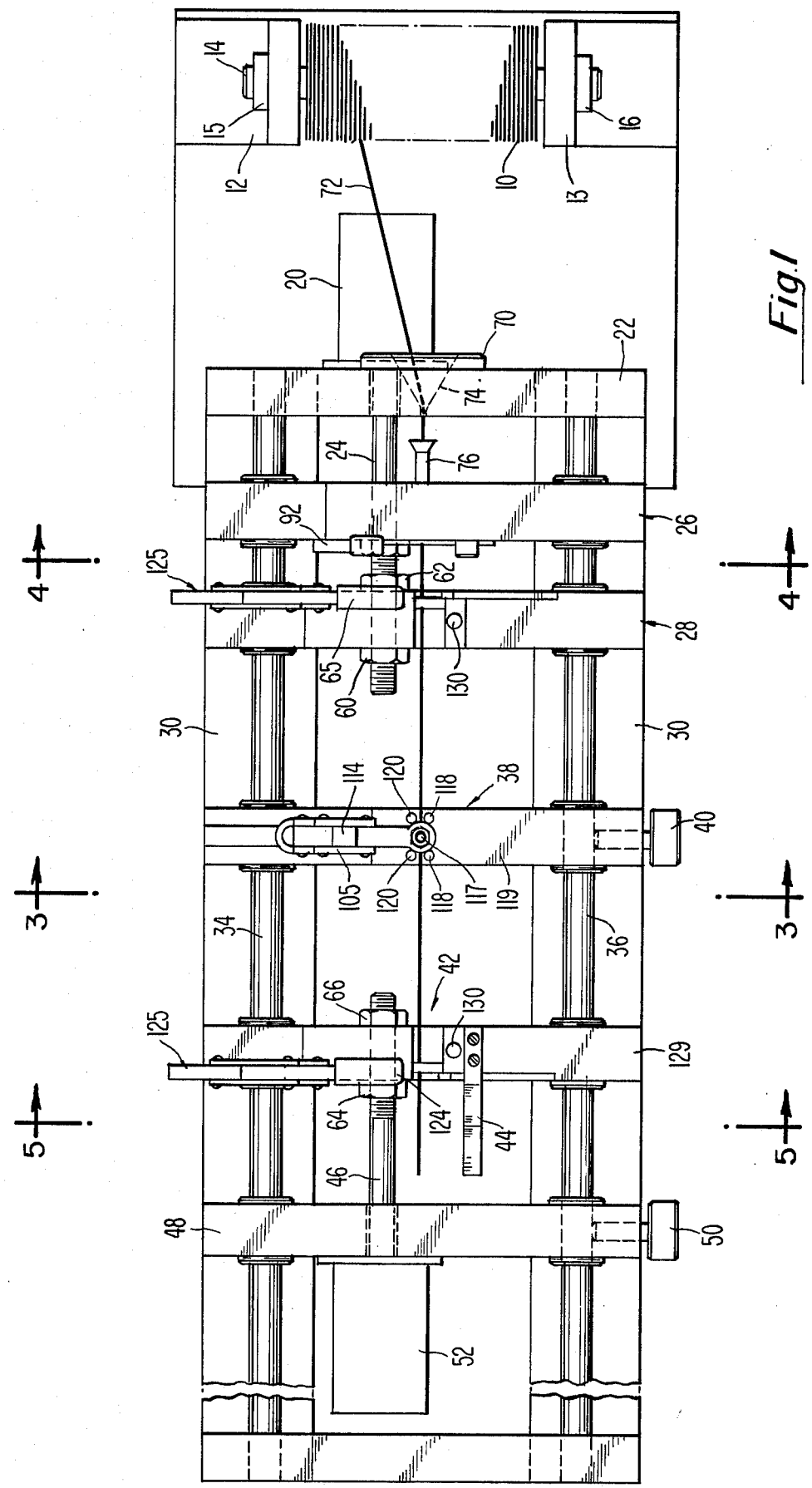
FIG. 1 is a perspective view as viewed from the front of the preferred embodiment of the present invention.

A rigid base plate 30 (FIG. 1) provides a platform for supporting the stripping and cutting apparatus. Cylindrical guides 34, 36 are affixed to the base plate 30 to provide a means for positioning elements of the stripping and cutting apparatus in order to set the length of the twisted wire pair 72 and the position on the twisted wire pair 72 where the partial strips are to be performed.

Affixed to the base plate 30 are feeder spool supports 12, 13 which are used as a support for the spool 10 of twisted wire pair. A cylindrical shaft 14 runs through the center axis of the spool 10 and through the two feeder spool supports 12, 13. Bolts 15 and 16 are threaded onto the cylindrical shaft 14 to prevent the cylindrical shaft 14 from slipping out of the feeder spool supports 12, 13.

Figure 2:
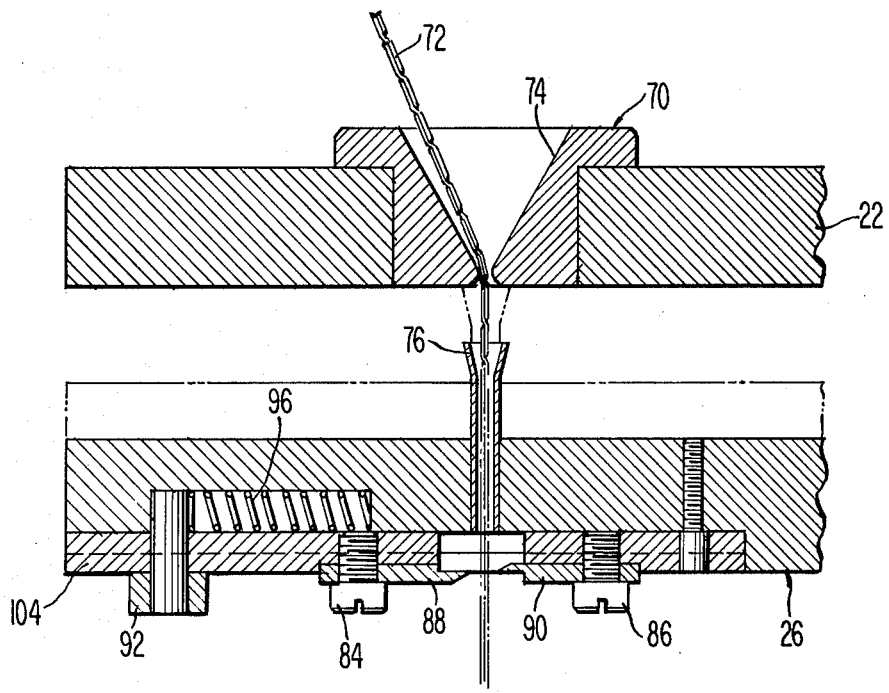
FIG. 2 is a section taken along the lines 2—2 of FIG. 4, showing the wire guide for feeding in the twisted wire pair and the wire cutter of the preferred embodiment of the present invention.

Also affixed to the base plate 30 is wire guide assembly 22, which is shown in greater detail in FIG. 2. The twisted pair conductors 72 are cut to the desired length by wire cutter 26, which is shown in greater detail in FIGS. 2 and 4. The wire cutter 26 is mounted on cylindrical guides 34,26 and may be manually moved left or right along the cylindrical guides 34, 36.

Figure 5:
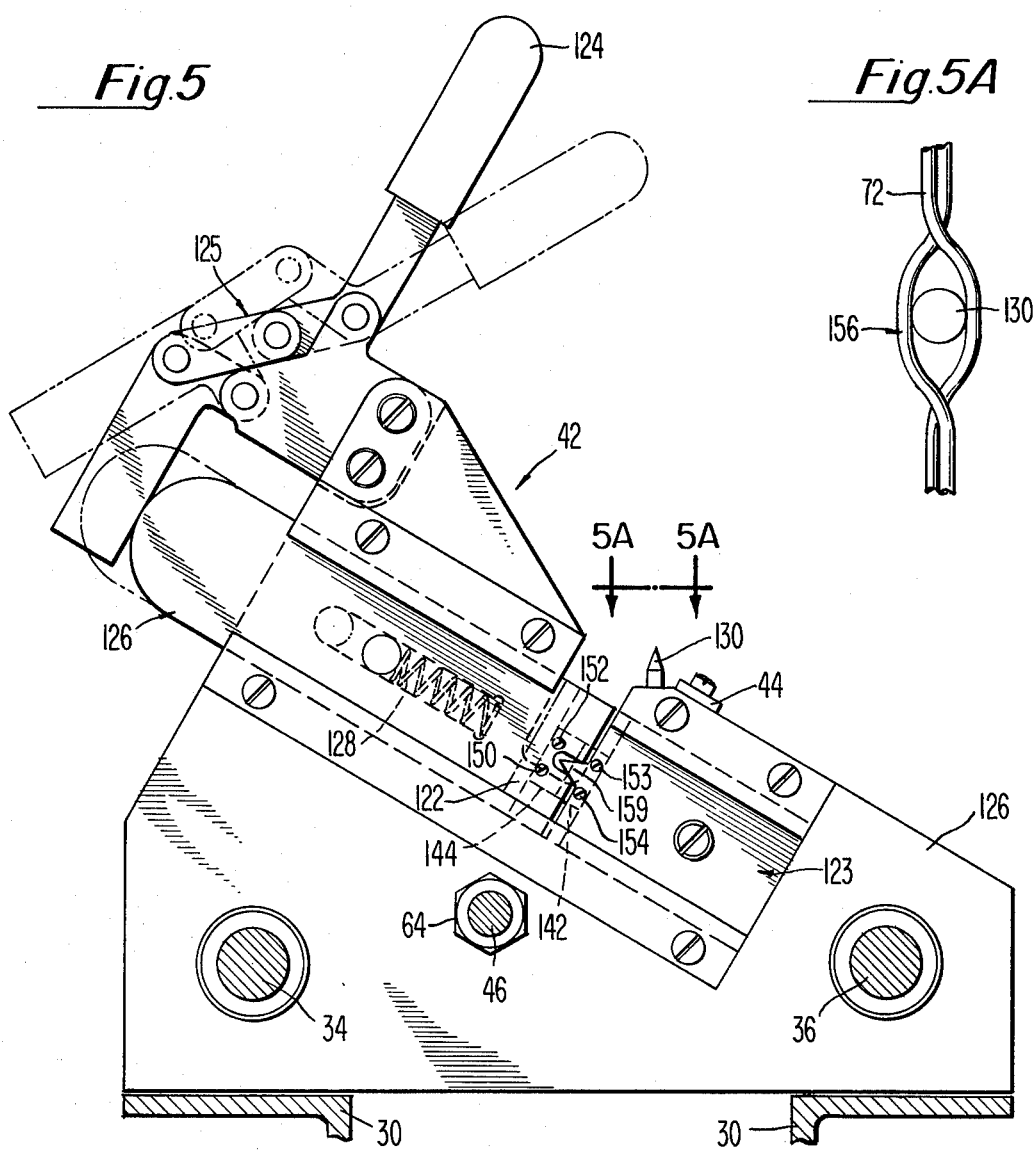
FIG. 5 is a side view taken along the lines 5—5 of FIG. 1, this view showing the left wire stripping assembly.

For stripping the right end of the twisted wire pair 72, stripper assembly 28, which is similar in construction to the stripper assembly detailed in FIG. 5, is provided. Stripper assembly 28 is mounted on cylindrical guides 34, 36. The movement of stripper assembly 28 is controlled by plunger 24 which is connected to air cylinder 20 which is affixed to wire guiding assembly 22. The plunger 24 of air cylinder 20 is threaded so that bearings 60 and 62 may be moved along the plunger 24. Bearings 60 and 62 allow the position of stripper assembly 28 to be varied in accordance with the length of the twisted wire pair 72 to be stripped. When air cylinder 20 is activated, plunger 24 moves to the right causing stripper assembly 28 to move right the same distance as the plunger 24 moves.

Figure 3:
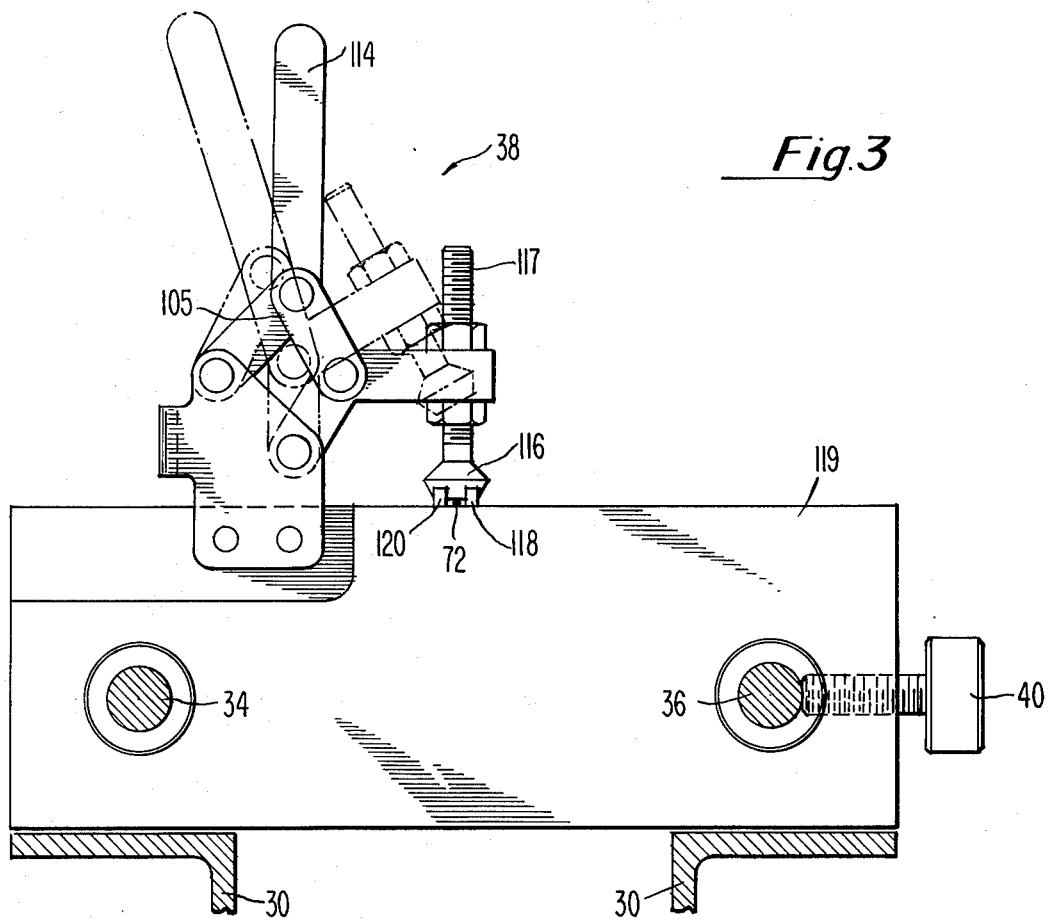
FIG. 3 is a side view taken along the lines 4—4 of FIG. 1, this view showing the center clamp assembly for clamping the midpoint of the twisted wire pair.

The midpoint of the twisted wire pair 72 is held in place by center clamp 38, which is shown in greater detail in FIG. 3. Center clamp 38 is mounted on cylindrical guides 34, 36 and can be slid along the cylindrical guides 34, 36 and then locked in the desired position by locking bolt 40.

Also mounted on cylindrical guides 34, 36 is stripper assembly 42, which is shown in detail in FIG. 5 and is similar in construction to stripper assembly 28. The movement of stripper assembly 42 is controlled by air cylinder 52, which is affixed to positioning guide 48. The plunger 46 of air cylinder 52 is threaded so that bearings 64 and 66 may be moved along plunger 46. Bearings 64 and 66 provide a fine control to vary the position of stripper assembly 42 in accordance with the length of the twisted wire pair 72 and the location where the partial strip is desired. A coarse control of the position of stripper assembly 42 is provided by moving positioning guide 48 along cylindrical guides 34, 36. When positioning guide 48 is in the desired position, it is locked in place by locking bolt 40. The movement of positioning guide 48 causes a corresponding movement in stripper assembly 42 which moves along cylindrical guides 34, 36 in direct relation to the movement of positioning guide 48.

Figure 4:
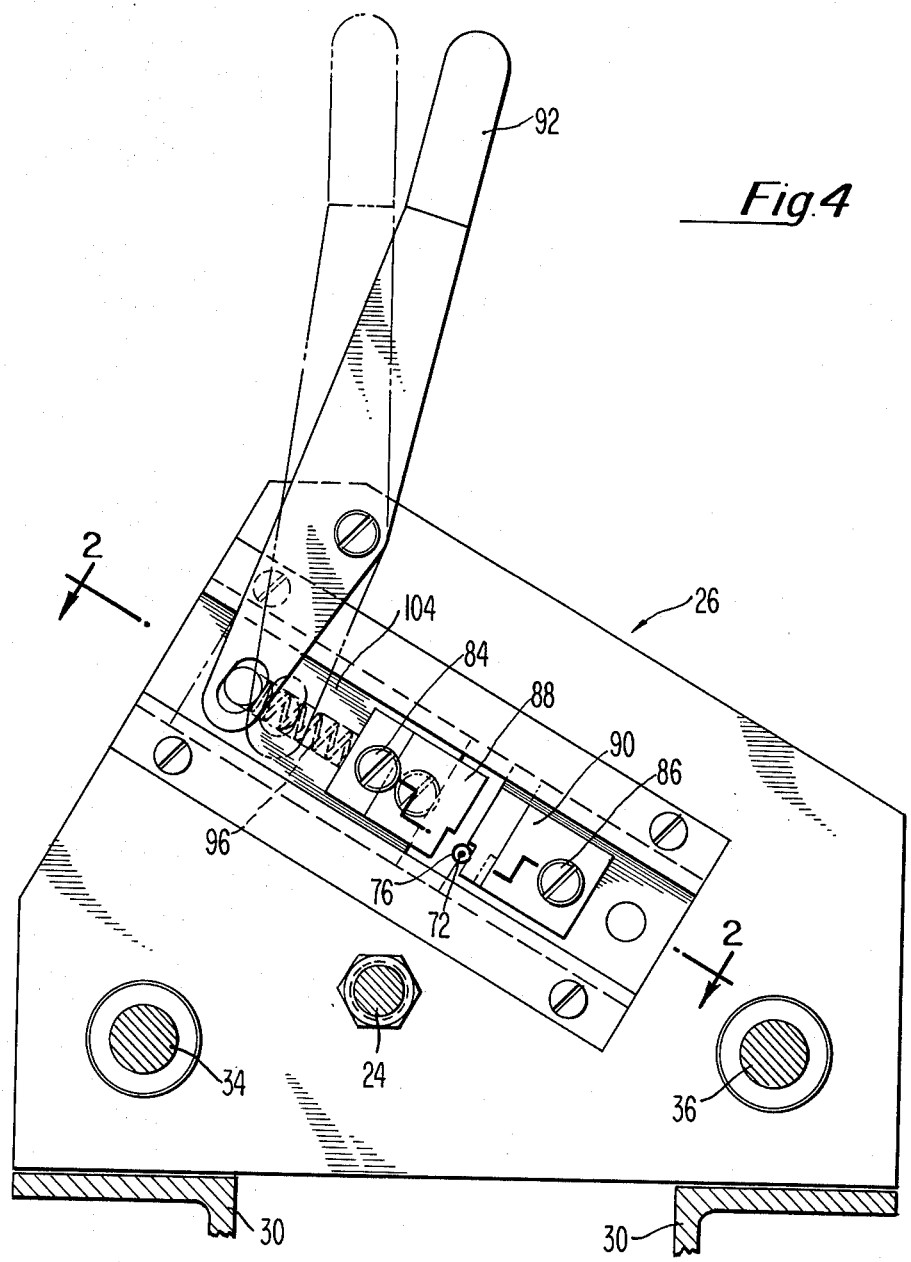
FIG. 4 is a side view taken along the lines 4—4 of FIG. 1, this view showing the wire cutter for cutting the twisted wire pair to the desired length.

As shown in FIG. 2, the wire guide assembly 22 (FIG. 1) is aligned with the wire cutter 26 (FIG. 1) so that the twisted wire pair 72 when fed through the wire guide assembly cone 74 is lined up with the feeder guide 76 of the wire cutter 26. The cutting blades 88, 90 of wire cutter 26 are held in place by bolts 84 and 86. Referring to FIG. 4, lever 92 can be moved in a counter clockwise direction, causing blade holder 104 and attached blade 88 to close against blade 90. As the blades 88, 90 close together, twisted wire pair 72 is cut into two sections. When lever 92 is released, the force exerted by compressed spring 96 causes blade 88 to return to its normally open position.

The midpoint of the twisted wire pair 72 is held in place by center clamp 38, which is shown in detail in FIG. 3. In the preferred embodiment, center clamp 38 utilizes a commercially available toggle clamp 105 and cushion assembly 117, both of which are well known in the mechanical art. The twisted wire pair 72 is placed between guides 118 and 120. Lever 114 may be moved clockwise, causing the rubber cushion 116 of the center clamp 38 to hold the twisted wire pair 72 rigidly against element 119. The toggle clamp 105 is self-locking and hence the twisted wire pair 72 is held in place until the lever 114 is restored to its open position.

The stripper assembly 42 is similar in construction to wire cutter 26. Referring to FIG. 5, a commercially available toggle clamp 125 serves to move blade holder 126 along the groove in element 129. With lever 124 in the position shown, blade holder 126 is locked in the position shown by the action of toggle clamp 125.

The end 122 of blade holder 126 serves both to hold one of the stripper blades 142 (FIG. 6) and to clamp the twisted wire pair 72 insulation as the stripper blade 142 pierces the insulation. FIG. 7 shows in detail the end 122 of blade holder 126. The second stripper blade 144 (FIG. 6) is affixed to a second blade holder 123, which is, in turn, affixed to element 129 of the stripper assembly 28. The action of blade holder 126 being moved against blade holder 123 serves to lock the stripper blades 142, 144 around the twisted wire pair 72 conductor and to clamp the twisted wire pair 72 insulation, as shown in FIG. 7.

Figure 6:
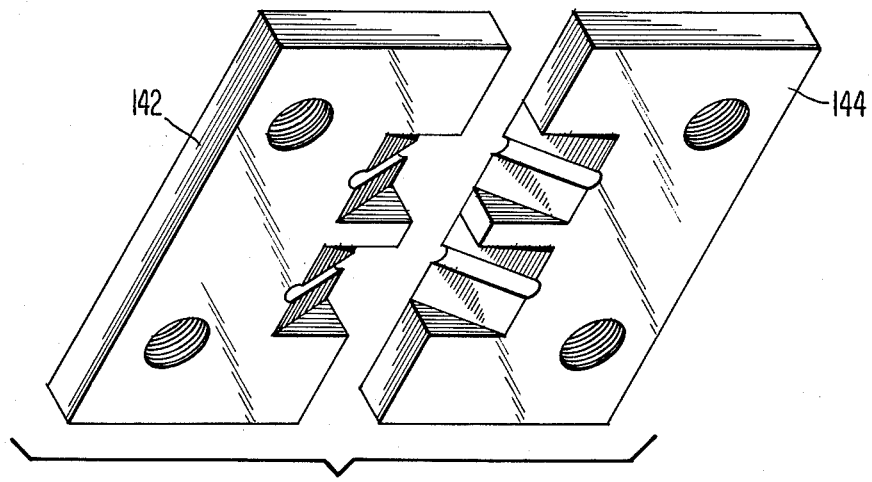
FIG. 6 is a side view of the stripper blades employed in the stripping assembly of FIG. 5.
Figure 7:
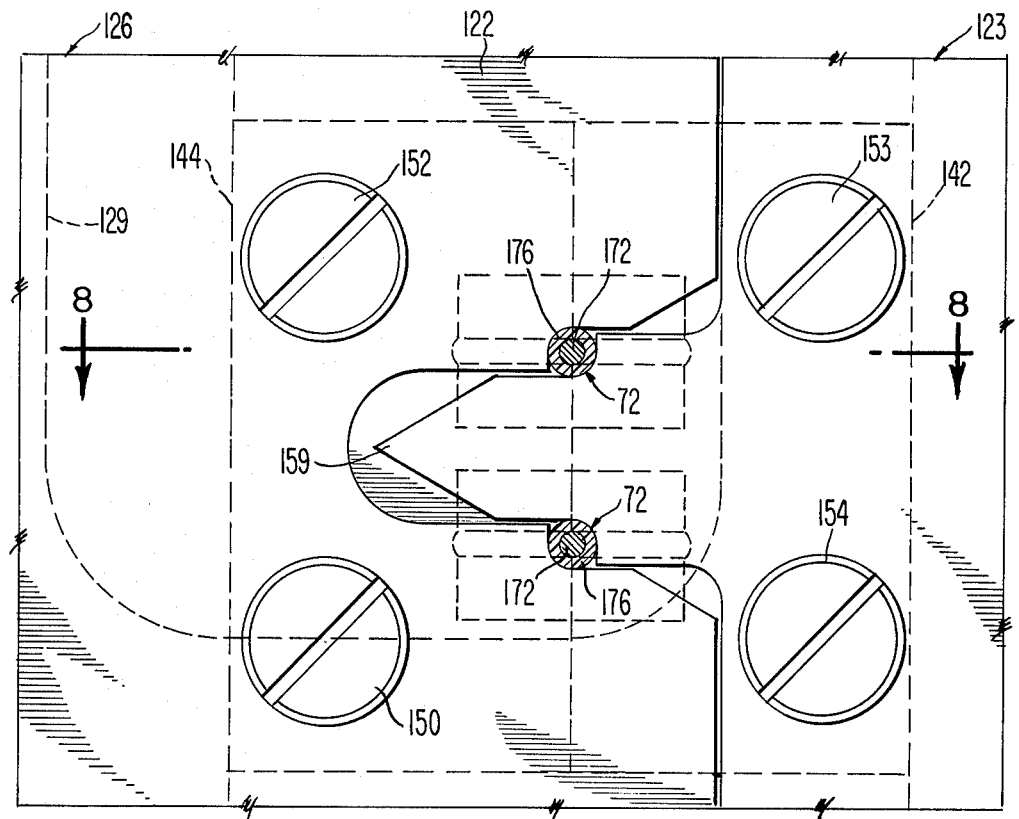
FIG. 7 is a side view of the stripper assembly of FIG. 5, showing in detail the guides for aligning the twisted wire pair against the stripper blades.
Figure 8:
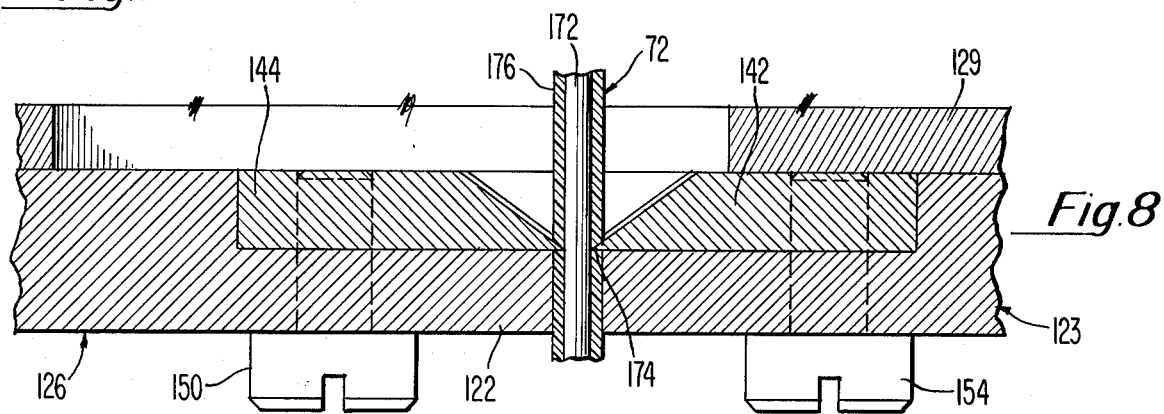
FIG. 8 is a section taken along the lines 8—8 of FIG. 7, showing in detail the stripper blades positioned against the twisted wire pair prior to the partial stripping operation.

In the preferred embodiment, commercially available stripper blades 142, 144, such as those detailed in FIG. 6, are utilized. Various guages of twisted wire pair 72 may be accommodated by using different guages of stripper blades 142, 144. Stripper blade 142 is affixed to the hidden side of blade holder position 122 (FIG. 7) by bolts 150 and 152, with the grooved side of stripper blade 142 facing outward. Stripper blade 144 is affixed to blade holder 123 in a similar fashion by bolts 153 and 154. FIG. 8 is a section through FIG. 7 along the lines 8—8, showing in detail the stripper blades 142, 144 locked in position around a twisted wire pair 72.

Figure 5A:
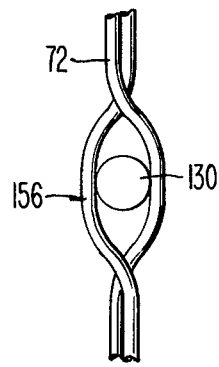
FIG. 5A is a top view of the spreader taken along the lines 5A—5A of FIG. 5, showing the twisted wire pair being spread.

Referring to FIG. 5, the stripper assembly 42 operates as follows: The wires of the twisted wire pair 72 are spread by manually pushing the twisted wire pair 72 over spreader 130 at the point on the twisted wire pair 72 where the strip is to be performed. FIG. 5A is a view along the lines 5A—5A (FIG. 5) showing the twisted wire pair 72 after it has been pushed onto the spreader 130. The spread loop 156 of the twisted wire pair 72 is removed from the spreader 130 and placed onto the pointed tip 159 (FIG. 7) of blade holder 123. Lever 124 is then moved to the position shown in FIG. 5, activating toggle clamp 125 which in turn pushes blade holder 126 so it moves against blade holder 123. As the two blade holder 126, 123 come together, the stripper blades 142, 144 clamp around the twisted wire pair 72 piercing the insulation and the blade holders tips 122 and 159 grip the insulation 176 of the twisted wire pair 72. FIG. 8 shows a section through the blade holders 126, 123 along the lines 8—8 of FIG. 7, with the stripper blades 142, 144 piercing the insulation of twisted wire pair 72.

The right end of the twisted wire pair 72 is locked into a second stripper assembly 28 (FIG. 1) which is similar in construction to stripper assembly 42.

Figure 9:
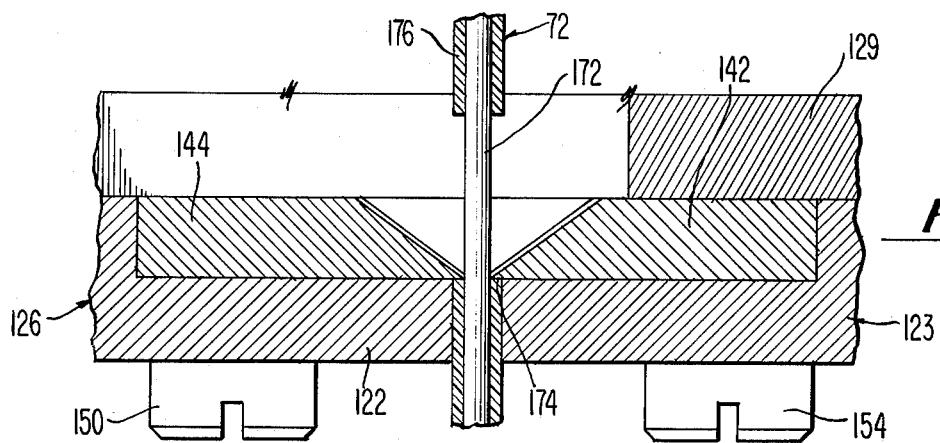
FIG. 9 is a view similar to FIG. 8 showing in detail the position of the stripper blades during the partial stripping operation.

The stripping operation is performed after the twisted wire pair 72 has been cut to length by wire cutter 26 and locked into stripper assemblies 28 and 42 and center clamp 38. FIG. 8 shows a view through one of the stripper assemblies 28, 42 with the twisted wire pair 72 insulation pierced by stripper blades 142, 144. Referring to FIG. 1, air cylinders 20 and 52 are simultaneously activated. The activation of cylinder 52 causes plunger 46 to move left along the horizontal axis of the base plate 30. Plunger 46 is coupled to stripper assembly 42 which moves on guide rods 34 and 36. As plunger 46 moves left, stripper assembly 42 will move left the same distance as the stroke of plunger 46. Since blade holders 123 and 126 are affixed to stripper assembly 42, they too will move left. This will result in stripping blades 142 and 144 pushing left against the left end of the severed insulation 174 (FIG. 9) of the twisted wire pair 72 at the same time blade holder tips 122 and 159 (FIG. 9) push the outside of the severed insulation 176 to the left. The center clamp 38 holds twisted wire pair 72 so that the twisted wire pair 72 will not slip as the insulation 176 is pushed to the left.

The length of the partial strip is equivalent to the plunger 46 stroke of cylinder 52, so that the length of the partial strip may be changed by changing to a cylinder 52 with a different plunger 46 stroke. By utilizing a cylinder 52 with a plunger 46 stroke equal to or greater than the distance between the stripper blades 142, 144 and the left end of twisted wire pair 72, full stripping of the ends of the twisted wire pair 72 is accomplished. In such an arrangement, the motion of the stripper blades 142, 144 and the blade holders 122, 123 against the severed insulation of each of the two wires of the twisted wire pair 72 untwists the portion of the twisted wire pair to the left of the stripper blades 142, 144.

The stripping of the right end of the twisted wire pair 72 is done simultaneously with and in the same manner as the stripping of the left end. In the case of the right end, center clamp 38 holds the midpoint of the twisted wire pair 72 and the motion of the air cylinder 20 plunger 24 pulls stripper assembly 28 to the right.

Figure 10:
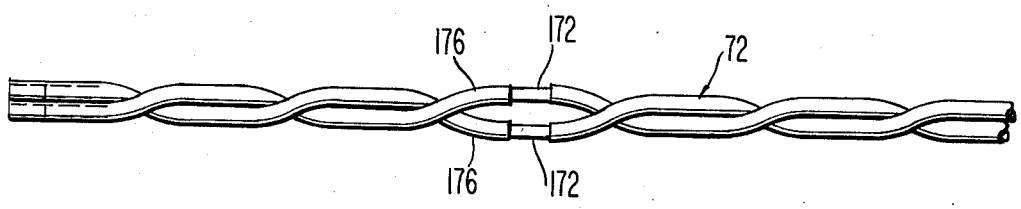
FIG. 10 is a perspective view of one end of a twisted wire pair after the partial stripping operation.

The operation of the device is as follows, with reference to FIG. 1. The twisted wire pair 72 end is pulled from spool 10 through the wire guide assembly cone 74, into feeder guide 76, through wire cutter 26, and then further left until the end of the twisted wire pair 72 is aligned to obtain the desired length of the twisted wire pair 72 as indicated on measuring scale 44. The section of the twisted wire pair 72 adjacent to center clamp 38 is then inserted between guides 118 and 120 and lever 114 is then depressed, activating toggle clamp 105 which causes the twisted wire pair to be clamped by cushion assembly 107. Wire cutter 26 is then pushed left until it comes in contact with stripper assembly 28. Lever 92 of wire cutter 26 is then depressed, causing the twisted wire pair 72 to be cut to the desired length. The wire cutter 26 is then pushed to the right so it is out of the way. The section of the twisted wire pair 72 adjacent to spreader 130 is then pushed onto spreader 130, causing a widening of one loop 156 in the twisted wire pair 72. The loop 156 in the twisted wire pair 72 is then positioned so it encircles the pointed tip 159 (FIG. 7) of blade holder 123 (FIG. 7) of stripper assembly 28 and lever 65 is depressed. Lever 65 activates toggle clamp 125 which in turn closes stripper blade elements 142 and 144 (FIG. 6) around the twisted wire pair 72. The left end of the twisted wire pair 72 is then engaged in stripper assembly 42 in the same manner as done for the right end of the twisted wire pair 72. Next, air cylinders 20 and 52 are simultaneously activated by a common air pressure source causing each of stripper assemblies 28 and 42 to be pulled in a direction away from center clamp 38. This operation performs the partial strip on both ends of the twisted wire pair 72. Levers 124, 114 and 65 are then released and the partially stripped twisted wire pair 72 is removed from the device. FIG. 10 shows in detail one end of the twisted wire pair 72 after the partial stripping operation has been completed.

While the preferred embodiment of the present invention has been described in connection with simultaneously stripping both ends of a twisted wire pair 72, those skilled in the art will recognize that the preferred embodiment may be utilized to strip only one end of a twisted wire pair 72 if the twisted wire pair is not engaged in stripper assembly 42. In fact, an alternate embodiment of the present invention capable of only stripping one end of a twisted wire pair 72, is obtained by eliminating stripper assembly 42, positioning guide 48 and air cylinder 52.

Although the preferred embodiment of the subject invention is limited to handling twisted wire pairs, it is obvious to those skilled in the art that alternate embodiments are available that can handle twisted wire cables made up of more than two twisted wires. For example, a three or four wire twisted cable can be accommodated in an alternate embodiment whose stripper assemblies 28, 42 have a second spreader adjacent to and to the right of spreader 130 (FIG. 5) and a second set of blade holders and stripper blades adjacent to and above the first set 122,123 (FIG. 7), with the second set of blade holders being connected to and engaged around the third or third and fourth wires by the movement of blade holder 126 (FIG. 5).

What is claimed is:

1. An apparatus for fully stripping insulation coatings from both sets of adjacent end portions of a predetermined length of insulated and pretwisted electrical conductor wire pair and simultaneously untwisting both sets of adjacent end portions of said pretwisted electrical conductor wire pair, comprising:

a frame;

wire guiding means disposed on said frame for feeding said pretwisted wire pair substantially lineraly with respect to said frame preparatory to stripping said insulation;

center clamping means supported on said frame beyond said wire guiding means in the direction of feeding of said pretwisted wire pair and including a movable clamp for releasably gripping said pretwisted wire pair;

first spreader means supported on said frame between said wire guiding means and said center clamping means for separating the wires of the first end of said pretwisted wire pair at a section of said pretwisted wire pair between two points where the wires of said pretwisted wire pair cross over each other, whereby a first separation is created between the wires;

first wire stripper means supported on said frame and adjacent to said first spreader means for receiving the first separated section of the pretwisted wire pair, for severing the insulation of each of the wires of the first end section, for gripping the end portion of the insulation of each wire of the first end section and for guiding the untwisting of the first end portions of the pretwisted wire pair;

first means supported on said frame on the wire guiding means side of said first wire stripper means and connected to said first wire stripper means for moving said first wire stripper means toward said wire guiding means, whereby said first wire stripper means strips the insulation from the first adjacent end portions of the pretwisted wire pair and simultaneously untwists the first adjacent end portions of the pretwisted wire pair;

second spreader means supported on said frame beyond said center clamping means in the direction of feeding of said pretwisted wire pair for separating the wires of the second end of said pretwisted wire pair at a section of said pretwisted wire pair between two points where the wires of said pretwisted wire pair cross over each other, whereby a second separation is created between the wires;

second wire stripper means supported on said frame and adjacent to said second spreader means for receiving the second separated section of the pretwisted wire pair, for severing the insulation of each of the wires of the second end section, for gripping the end portion of the insulation of each wire of the second end section and for guiding the untwisting of the second end portions of the pretwisted wire pair;

second means supported on said frame beyond said second stripper means in the direction of feeding of said pretwisted wire pair and connected to said second wire stripper means for moving said second wire stripper means away from said center clamping means, whereby said second wire stripper means strips the insulation from the second adjacent end portions of the pretwisted wire pair and simultaneously untwists the second adjacent end portions of the pretwisted wire pair; and means connected to said first and second moving means for simultaneously activating said first and second moving means.

2. The apparatus of claim 1 wherein said first and second wire stripper means each comprises:
  a support;
  a first insulation untwisting guide rigidly mounted on said support for receiving the separated section of said pretwisted wire pair, for gripping the first one half of the circumference of each end section of the two wires' insulation and for guiding the untwisting of the end sections of the two wires;
  a first insulation cutting blade including two cutting edges rigidly attached to the side of said first insulation untwisting guide closest to said center clamping means for piercing the first one half of the circumference of each of said two wires' insulation;
  a second insulation untwisting guide slidably mounted on said support opposing said first insulation untwisting guide for gripping the second one half of the circumference of each end section of the two wires' insulation and for guiding the untwisting of the end sections of the two wires;
  a second insulation cutting blade including two cutting edges rigidly attached to the side of said second insulation untwisting guide closest to said center clamping means for piercing the second one half of the circumference of each of said two wires' insulation; and
  means connected to said support and said second insulation untwisting guide for moving said second insulation untwisting guide towards and in alignment with said first insulation untwisting guide and for holding said second insulation untwisting guide against said first insulation untwisting guide, whereby said first and second insulation cutting blades circumscribe and pierce the entire circumference of each of said two wires' insulation and said first and second insulation untwisting guides circumscribe and grip the entire circumference of each of the two wires' end section insulation.

3. The apparatus of claim 2 wherein said first insulation untwisting guide includes an acute angled tip for receiving the separated section of said pretwisted wire pair, each side of said tip including a notch to receive and encircle the first one half of the circumference of each of the respective two wires' insulation.

4. The apparatus of claim 3 wherein said second insulation untwisting guide includes an acute angled slot matched to coincide with the acute angled tip of said first insulation untwisting guide, each side of said slot including a notch to receive and encircle the second one half of the circumference of each of the respective two wires' insulation.

5. The apparatus of claim 4 wherein said first and second cutting blades are positioned such that each cutting edge of each of said blades overlaps one of the notches in the corresponding first and second insulation untwisting guide by a distance not greater than the thickness of the insulation.

6. The apparatus of claim 1 further characterized in that said first and second spreader means each includes a rod having a pointed end.

7. An apparatus for partially stripping insulation coatings from one set of adjacent end portions of a predetermined length of insulated and pretwisted electrical conductor wire pair, comprising:
  a frame;
  wire guiding means disposed on said frame for feeding said pretwisted wire pair substantially linerally with respect to said frame preparatory to stripping said insulation;
  center clamping means supported on said frame beyond said wire guiding means in the direction of feeding of said pretwisted wire pair and including a movable clamp for releasably gripping said pretwisted wire pair;
  spreader means supported on said frame between said wire guiding means and said center clamping means for separating the wires of said pretwisted wire pair at a section of said pretwisted wire pair between two points where the wires of said pretwisted wire pair cross over each other, whereby a separation is created between the wires;
  wire stripper means supported on said frame including wire untwisting means and adjacent to said spreader means for receiving the separated section of the pretwisted wire pair, for severing the insulation of each of the wires and for gripping the end portion of the insulation of each wire; and
  means supported on said frame on the wire guiding means side of said wire stripper means and connected to said wire stripper means for moving said wire stripper means toward said wire guiding means a distance less than the length of the severed insulation.

8. The apparatus of claim 7 wherein said wire stripper means comprises:
  a support;
  said wire untwisting means including a first insulation untwisting guide rigidly mounted on said support for receiving the separated section of said pretwisted wire pair, for gripping the first one half of the circumference of each end section of the two wires' insulation;
  a first insulation cutting blade including two cutting edges rigidly attached to the side of said first insulation untwisting guide closest to said center clamping means for piercing the first one half of the circumference of each of said two wires' insulation;
  said wire untwisting means further including a second insulation untwisting guide slidably mounted on said support opposing said first insulation untwisting guide for gripping the second one half of the circumference of each end section of the two wires' insulation;
  a second insulation cutting blade including two cutting edges rigidly attached to the side of said second insulation untwisting guide closest to said center clamping means for piercing the second one half of the circumference of each of said two wires' insulation; and
  means connected to said support and said second insulation untwisting guide for moving said second insulation untwisting guide towards and in alignment with said first insulation untwisting guide and for holding said second insulation untwisting guide against said first insulation untwisting guide, whereby said first and second insulation cutting blades circumscribe and pierce the entire circumference of each of said two wires' insulation and said first and second insulation untwisting guides circumscribe and grip the entire circumference of each of the two wires' end section insulation.

9. The apparatus of claim 8 wherein said first insulation untwisting guide includes an acute angled tip for receiving the separated section of said pretwisted wire pair, each side of said tip including a notch to receive and encircle the first one half of the circumference of each of the respective two wires' insulation.

10. The apparatus of claim 9 wherein said second insulation untwisting guide includes an acute angled slot matched to coincide with the acute angled tip of said first insulation untwisting guide, each side of said slot including a notch to receive and encircle the second one half of the circumference of each of the respective two wires' insulation.

11. The apparatus of claim 10 wherein said first and second cutting blades are positioned such that each cutting edge of each of said blades overlaps one of the notches in the corresponding first and second insulation untwisting guide by a distance not greater than the thickness of the insulation.

12. The apparatus of claim 7 further characterized in that said spreader means includes a rod having a pointed end.

13. An apparatus for partially stripping insulation coatings from both sets of adjacent end portions of a predetermined length of insulated and pretwisted electrical conductor wire pair, comprising:
a frame;
wire guiding means disposed on said frame for feeding said pretwisted wire pair substantially linearly with respect to said frame preparatory to stripping said insulation;
center clamping means supported on said frame beyond said wire guiding means in the direction of feeding of said pretwisted wire pair and including a movable clamp for releasably gripping said pretwisted wire pair;
first spreader means supported on said frame between said wire guiding means and said center clamping means for separating the wires of the first end of said pretwisted wire pair at a section of said pretwisted wire pair between two points where the wires of said pretwisted wire pair cross over each other, whereby a first separation is created between the wires;
first wire stripper means supported on said frame and adjacent to said first spreader means for receiving the first separated section of the pretwisted wire pair, for severing the insulation of each of the wires of the first end section and for gripping the end portion of the insulation of each wire of the first end section;
first means supported on said frame on the wire guiding means side of said first wire stripper means and connected to said first wire stripper means for moving said first wire stripper means toward said wire guiding means a distance less than the length of the first end section's severed insulation;
second spreader means supported on said frame beyond said center clamping means in the direction of feeding of said pretwisted wire pair for separating the wires of the second end of said pretwisted wire pair at a section of said pretwisted wire pair between two points where the wires of said pretwisted wire pair cross over each other, whereby a second separation is created between the wires;
second wire stripper means supported on said frame and adjacent to said second spreader means for receiving the second separated section of the pretwisted wire pair, for severing the insulation of each of the wires of the second end section and for gripping the end portion of the insulation of each wire of the second end section;
second means supported on said frame beyond said second stripper means in the direction of feeding of said pretwisted wire pair and connected to said second wire stripper means for moving said second wire stripper means away from said center clamping means a distance less than the length of the second end section's severed insulation; and
means connected to said first and second moving means for simultaneously activating said first and second moving means.

14. The apparatus of claim 13 wherein said first and second wire stripper means each comprises:
a support;
a first insulation untwisting guide rigidly mounted on said support for receiving the separated section of said pretwisted wire pair, for gripping the first one half of the circumference of each end section of the two wires' insulation and for guiding the untwisting of the end sections of the two wires;
a first insulation cutting blade including two cutting edges rigidly attached to the side of said first insulation untwisting guide closest to said center clamping means for piercing the first one half of the circumference of each of said two wires' insulation;
a second insulation untwisting guide slidably mounted on said support opposing said first insulation untwisting guide for gripping the second one half of the circumference of each end section of the two wires' insulation and for guiding the untwisting of the end sections of the two wires;
a second insulation cutting blade including two cutting edges rigidly attached to the side of said second insulation untwisting guide closest to said center clamping means for piercing the second one half of the circumference of each of said two wires' insulation; and
means connected to said support and said second insulation untwisting guide for moving said second insulation untwisting guide towards and in alignment with said first insulation untwisting guide and for holding said second insulation untwisting guide against said first insulation untwisting guide, whereby said first and second insulation cutting blades circumscribe and pierce the entire circumference of each of said two wires' insulation and said first and second insulation untwisting guides circumscribe and grip the entire circumference of each of the two wires' end section insulation.

15. The apparatus of claim 14 wherein said first insulation untwisting guide includes an acute angled tip for receiving the separated section of said pretwisted wire pair, each side of said tip including a notch to receive and encircle the first one half of the circumference of each of the respective two wires' insulation.

16. The apparatus of claim 15 wherein said second insulation untwisting guide includes an acute angled slot matched to coincide with the acute angled tip of said first insulation untwisting guide, each side of said slot including a notch to receive and encircle the second one half of the circumference of each of the respective two wires' insulation.

17. The apparatus of claim 16 wherein said first and second cutting blades are positioned such that each cutting edge of each of said blades overlaps one of the notches in the corresponding first and second insulation untwisting guide by a distance not greater than the thickness of the insulation.

18. The apparatus of claim 13 further characterized in that said first and second spreader means each includes a rod having a pointed end.

19. An apparatus for fully stripping insulation coatings from one set of adjacent end portions of a predetermined length of insulated and pretwisted electrical conductor wire pair and simultaneously untwisting the end portions of said pretwisted electrical conductor wire pair, comprising:
   a frame;
   wire guiding means disposed on said frame for feeding said pretwisted wire pair substantially linearly with respect to said frame preparatory to stripping said insulation;
   center clamping means supported on said frame beyond said wire guiding means in the direction of feeding of said pretwisted wire pair and including a movable clamp for releasably gripping said pretwisted wire pair;
   spreader means supported on said frame between said wire guiding means and said center clamping means for separating the wires of said pretwisted wire pair at a section of said pretwisted wire pair between two points where the wires of said pretwisted wire pair cross over each other, whereby a separation is created between the wires;
   wire stripper means supported on said frame including wire untwisting means and adjacent to said spreader means for receiving the separated section of the pretwisted wire pair, for severing the insulation of each of the wires, for gripping the end portion of the insulation of each wire and for guiding the untwisting of the end portions of the pretwisted wire pair; and
   means supported on said frame on the wire guiding means side of said wire stripper means and connected to said wire stripper means for moving said wire stripper means toward said wire guiding means, whereby said wire stripper means strips the insulation from the adjacent end portions of the pretwisted wire pair and simultaneously untwists the adjacent end portions of the pretwisted wire pair.

20. The apparatus of claim 19 wherein said wire stripper means comprises:
   a support;
   said wire untwisting means including a first insulation untwisting guide rigidly mounted on said support for receiving the separated section of said pretwisted wire pair, for gripping the first one half of the circumference of each end section of the two wires' insulation and for guiding the untwisting of the end sections of the two wires;
   a first insulation cutting blade including two cutting edges rigidly attached to the side of said first insulation untwisting guide closest to said center clamping means for piercing the first one half of the circumference of each of said two wires' insulation;
   said wire untwisting means further including a second insulation untwisting guide slidably mounted on said support opposing said first insulation untwisting guide for gripping the second one half of the circumference of each end section of the two wires' insulation and for guiding the untwisting of the end sections of the two wires;
   a second insulation cutting blade including two cutting edges rigidly attached to the side of said second insulation untwisting guide closest to said center clamping means for piercing the second one half of the circumference of each of said two wires' insulation; and
   means connected to said support and said second insulation untwisting guide for moving said second insulation untwisting guide towards and in alignment with said first insulation untwisting guide and for holding said second insulation untwisting guide against said first insulation untwisting guide, whereby said first and second insulation cutting blades circumscribe and pierce the entire circumference of each of said two wires' insulation and said first and second insulation untwisting guides circumscribe and grip the entire circumference of each of the two wires' end section insulation.

21. The apparatus of claim 20 wherein said first insulation untwisting guide includes an acute angled tip for receiving the separated section of said pretwisted wire pair, each side of said tip including a notch to receive and encircle the first one half of the circumference of each of the respective two wires' insulation.

22. The apparatus of claim 21 wherein said second insulation untwisting guide includes an acute angled slot matched to coincide with the acute angled tip of said first insulation untwisting guide, each side of said slot including a notch to receive and encircle the second one half of the circumference of each of the respective two wires' insulation.

23. The apparatus of claim 22 wherein said first and second cutting blades are positioned such that each cutting edge of each of said blades overlaps one of the notches in the corresponding first and second insulation untwisting guide by a distance not greater than the thickness of the insulation.

24. The apparatus of claim 19 further charactried in that said spreader means includes a rod having a pointed end.

* * * * *